A. CHRISTIANSON.
SIX-WHEEL TRUCK.
APPLICATION FILED AUG. 13 1920.
1,409,079.
Patented Mar. 7, 1922.
2 SHEETS—SHEET 1.
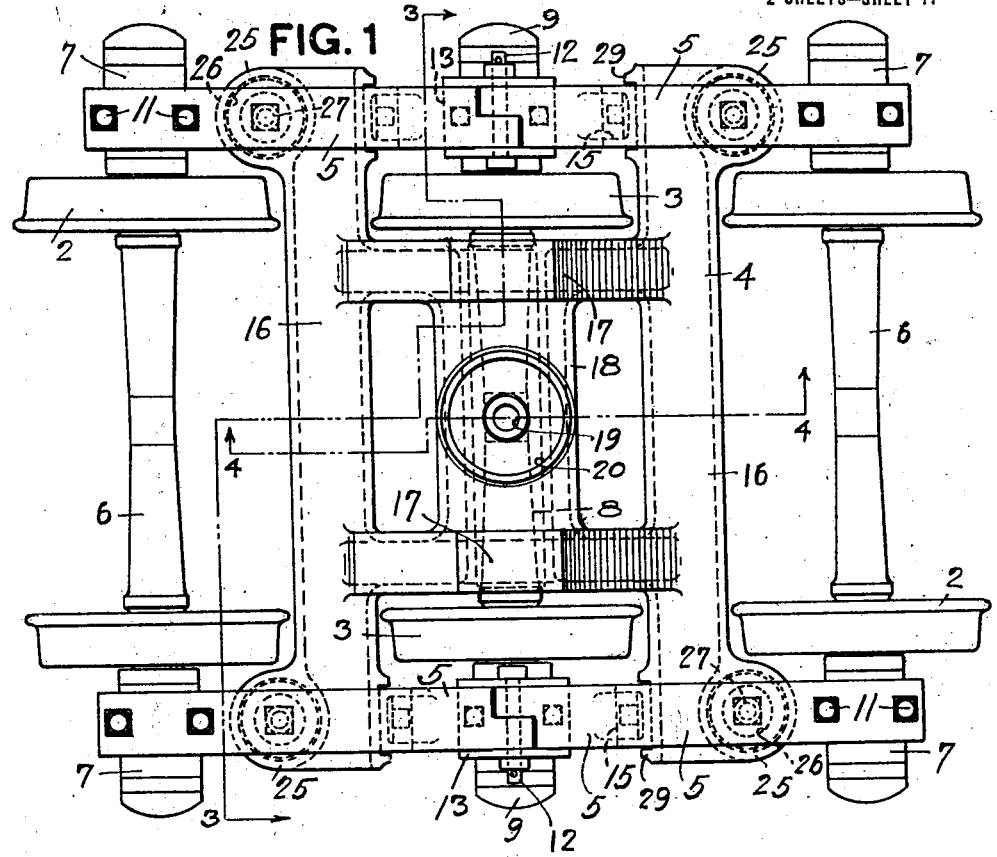
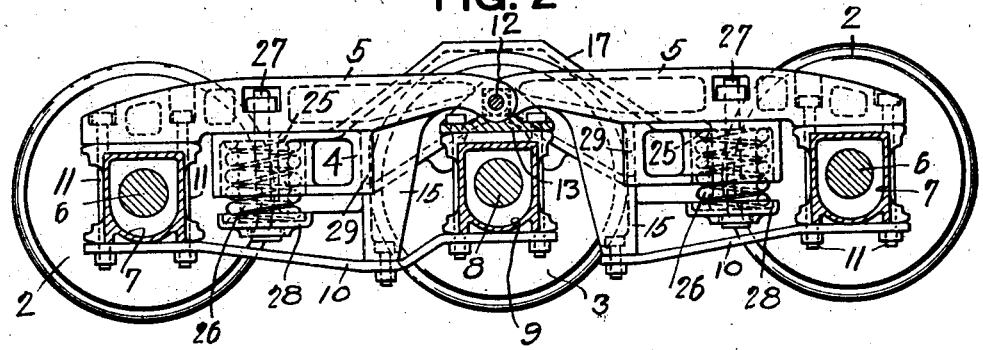
INVENTOR
Andrew Christianson

A. CHRISTIANSON.
SIX-WHEEL TRUCK.
APPLICATION FILED AUG. 13 1920.

1,409,079.

Patented Mar. 7, 1922.
2 SHEETS—SHEET 2.

INVENTOR
Andrew Christianson

UNITED STATES PATENT OFFICE.

ANDREW CHRISTIANSON, OF BUTLER, PENNSYLVANIA, ASSIGNOR TO STANDARD STEEL CAR COMPANY, OF PITTSBURGH, PENNSYLVANIA, A CORPORATION OF PENNSYLVANIA.

SIX-WHEEL TRUCK.

1,409,079.   Specification of Letters Patent.   Patented Mar. 7, 1922.

Application filed August 13, 1920. Serial No. 403,185.

*To all whom it may concern:*

Be it known that I, ANDREW CHRISTIANSON, a citizen of the United States, and a resident of Butler, in the county of Butler and State of Pennsylvania, have invented a new and useful Improvement in Six-Wheel Trucks; and I do hereby declare the following to be a full, clear, and exact description thereof.

My invention relates to six-wheel trucks for railway cars, and it has for its object to provide a truck of the character indicated which shall be simple in construction and of great strength and flexibility.

Figure 3:
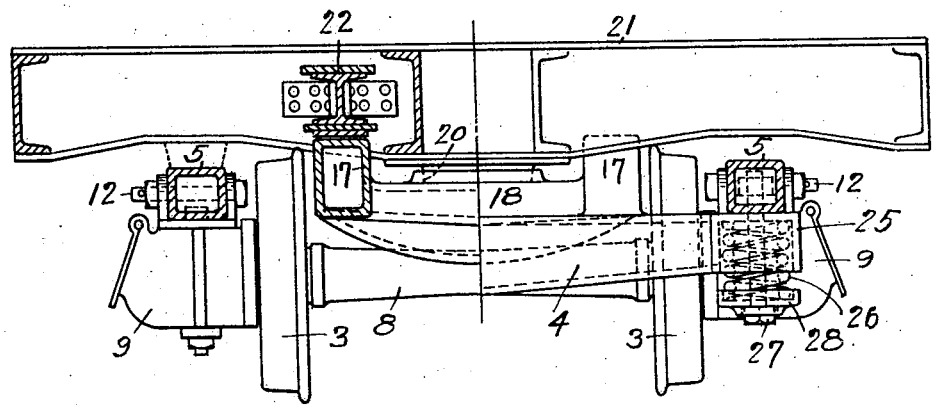

In the accompanying drawing, Fig. 1 is a plan view of a truck constructed in accordance with my invention; Fig. 2 is a side view of the same truck, partly in elevation and partly in section; Fig. 3 is a transverse vertical sectional view taken substantially along the line 3—3, Fig. 1; and Fig. 4 is a sectional view taken centrally through the truck bolster substantially on the line 4—4, Fig. 1.

The truck illustrated in the drawings is composed of front and rear sets of wheels 2, an intermediate set of wheels 3, a truck bolster 4 and two pairs of articulated equalizer bars 5. The front and rear wheels 2 are carried in the usual manner by axles 6 provided with journal boxes 7. Each of the intermediate wheels 3 is carried by a short shaft 8 which is received in a journal box 9. Each of the journal boxes 9 is supported by a strap 10 which extends between the journal box 9 and one of the adjacent journal boxes 7, as shown in Fig. 2, and which is bolted to the underside of each of these journal boxes.

Each of the equalizer bars 5 consists, as best shown in Fig. 2, of a framed structure that is secured to the top of its outer journal box 7 by means of bolts 11 which also serve to attach the strap 10 to the under side of the journal box. The inner ends of the two equalizer bars at each side of the truck are connected together by means of a bolt 12 which also extends through openings in the triangular upstanding ears of a bearing plate 13 which is bolted to the top of the central journal box 9. Each of the equalizer bars 5 has a vertical extension or column 15 which extends downward near the central journal box 9 and is bolted to the strap 10.

Figure 4:
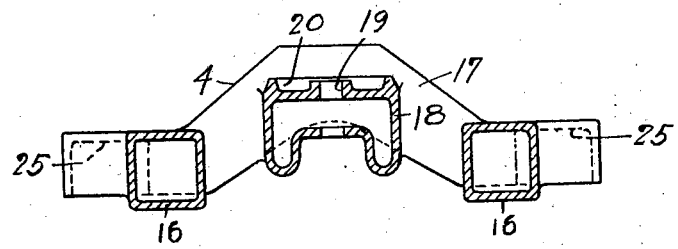

The truck bolster 4 consists of two parallel members 16 which extend from side to side of the truck and are connected by means of arches 17 which are themselves connected together by means of a central web 18 that is provided, as shown in Fig. 4, with openings 19 to receive the king-pin of the truck, and with seats 20 to receive the center plate of the car bolster 21, as shown in Fig. 3.

Fig. 3 also shows at 22 a portion of the underframe of the car and the manner in which the underframe is supported upon the truck bolster. It will be observed that all of the parts of the truck bolster 4 are formed of spaced top and bottom plates connected together to form a strong and rigid structure.

The four outer corners of the truck bolster 4 are provided with seats 25 to receive springs 26 that are suspended from the equalizer bars 5 by means of bolts 27, each of which carries at its lower end a cup 28 that supports the lower end of the spring 26. Directly opposite to the springs 26 the members 16 of the truck bolster are provided with ribs 29 which form vertical guideways engaging the columns 15 that extend downward from the equalizer bars 5, as indicated above.

It will be observed that all of the parts composing the frame of my improved truck are so constructed as to have great rigidity and strength, while at the same time the central set of wheels is flexibly mounted with respect to the outer wheels and with respect to the truck bolster. This flexibilty is accomplished by supporting each of the central journal boxes from one of the outer journal boxes only, this construction, as indicated above, being clearly shown in Fig. 2.

It will also be evident that various changes in the form and arrangement of parts may be made without departing from my invention, and I therefore desire that no limitations be imposed upon my invention except such as are indicated in the appended claims.

What I claim is:

1. A truck for railway cars comprising two outer pairs of wheels, an intermediate pair of wheels, journal boxes for all of the said wheels, and a supporting strap extending between each of the said intermediate journal boxes to one only of the said outer journal boxes.

2. A truck for railway cars comprising two outer pairs of wheels, an intermediate pair of wheels, journal boxes for all of the said wheels, two pairs of equalizer bars, one pair being disposed at each side of the truck, each of the equalizer bars being secured to the top of one of the outer journal boxes and being pivotally secured to the adjacent equalizer bar above one of the intermediate journal boxes, a bearing plate secured to the top of the said intermediate journal box and supporting the joined ends of said equalizer bars, and means for pivotally securing said bars to said bearing plates.

3. A truck for railway cars comprising two outer pairs of wheels, an intermediate pair of wheels, journal boxes for all of the said wheels, a bearing-plate secured to the top of each of the intermediate journal boxes and having upstanding ears, two pairs of equalizer bars, the equalizer bars composing each pair being secured to the outer journal boxes at one side of the truck and having their inner ends overlapping and resting upon the said bearing plate on the intermediate journal box at the same side of the truck, and a pivot member extending through the said overlapping ends of the equalizer bars and through the said upstanding ears of the said bearing plate.

4. A truck for railway cars comprising two outer sets of wheels, an intermediate set of wheels, journal boxes for all of the said wheels, two pairs of equalizer bars, the equalizer bars composing each pair being secured at their outer ends upon the outer journal boxes at one side of the truck and having their inner ends pivotally secured together and resting upon the intermediate journal box at the same side of the truck, a column extending downward from each of said equalizer bars adjacent to the intermediate journal boxes, a truck bolster and a single guideway formed at each of the four corners of said bolster and connecting the adjacent column.

5. A truck for railway cars comprising a bolster composed of two spaced parallel portions extending from side to side of the truck, means for connecting the said parallel portions rigidly together, spring-seats disposed at the ends of the said parallel portions, springs received in said seats and means for suspending the said springs.

6. A truck for railway cars comprising two outer sets of wheels, an intermediate set of wheels, journal boxes for all of the said wheels, a pair of equalizer bars at each side of the truck, the equalizer bars composing each pair being secured at their outer ends upon the outer journal boxes at one side of the truck and having their inner ends pivotally secured together and resting upon the intermediate journal box at the same side of the truck, columns extending downwardly from the said equalizer bars adjacent to the intermediate journal boxes, straps secured to the under side of each of the outer journal boxes and to the said columns, a spring suspended from each of the said equalizer bars, and a bolster carried by the said springs, the said bolster being composed of spaced parallel portions extending from side to side of the truck and having seats at the ends of the said parallel portions for receiving the said springs.

7. A truck for railway cars comprising two outer sets of wheels, an intermediate set of wheels, side frames, a truck bolster, springs supporting the said bolster, and means extending through the said springs for suspending the said springs from the said side frames.

In testimony whereof, I, the said ANDREW CHRISTIANSON, have hereunto set my hand.

ANDREW CHRISTIANSON.

Witnesses:
JOHN F. WILL,
EDITH K. FREESE.